United States Patent

Lee (10) Patent No.: US 9,543,562 B2
(45) Date of Patent: Jan. 10, 2017

(54) SECONDARY BATTERY (75) Inventor: Myungro Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 822 days.

(21) Appl. No.: 13/115,037

(22) Filed: May 24, 2011

(65) Prior Publication Data

US 2012/0107655 A1  May 3, 2012

Related U.S. Application Data

(60) Provisional application No. 61/408,984, filed on Nov. 1, 2010.

(51) Int. Cl.
| | |
|---|---|
| *H01M 4/00* | (2006.01) |
| *H01M 2/26* | (2006.01) |
| *H01M 2/30* | (2006.01) |
| *H01M 10/04* | (2006.01) |
| *H01M 2/02* | (2006.01) |
| *H01M 10/052* | (2010.01) |
| *H01M 10/0587* | (2010.01) |

(52) U.S. Cl.
CPC ............ *H01M 2/263* (2013.01); *H01M 2/26* (2013.01); *H01M 2/30* (2013.01); *H01M 10/0431* (2013.01); *H01M 2/0217* (2013.01); *H01M 10/052* (2013.01); *H01M 10/0587* (2013.01)

(58) Field of Classification Search
CPC .. H01M 10/0431; H01M 6/10; H01M 10/263; H01M 10/26; H01M 10/0587; H01M 10/052; H01M 2/26; H01M 2/263; H01M 2/30; H01M 2/0217
USPC .................................. 429/94, 163, 164, 211
See application file for complete search history.

(56) References Cited

U.S. PATENT DOCUMENTS

2003/0148175 A1   8/2003 Iwanaga et al.
2003/0215700 A1   11/2003 Hosoda et al.
(Continued)

FOREIGN PATENT DOCUMENTS

| CN | 2722447 Y | 8/2005 |
|---|---|---|
| CN | 2849999 Y | 12/2006 |

(Continued)

OTHER PUBLICATIONS

KR1020040054201 English Translation via KPO obtained Mar. 9, 2016.*

(Continued)

*Primary Examiner* — Nicholas P D'Aniello
*Assistant Examiner* — Jimmy K Vo
(74) *Attorney, Agent, or Firm* — Knobbe Martens Olson & Bear LLP (57) ABSTRACT

A secondary battery comprises: a plurality of cylindrical electrode assemblies, wherein each electrode assembly comprises a positive electrode plate and a negative electrode plate rolled together with a separator interposed between the positive electrode plate and the negative electrode plate; a can housing the plurality of electrode assemblies; a cap assembly sealing the can; a positive electrode tab coupled to the positive electrode plate in each electrode assembly; and a negative electrode tab coupled to the negative electrode plate in each electrode assembly, wherein a first plurality of positive electrode tabs is aligned along a first line when viewed in one direction, and wherein a first plurality of negative electrode tabs is aligned along a second line when viewed in the one direction.

12 Claims, 7 Drawing Sheets

(56) References Cited

U.S. PATENT DOCUMENTS

| | | |
|---|---|---|
| 2004/0258987 A1* | 12/2004 | Shin ............................. 429/163 |
| 2006/0127751 A1* | 6/2006 | Woo ............................. 429/128 |
| 2009/0061304 A1 | 3/2009 | Muraoka et al. |
| 2010/0143773 A1* | 6/2010 | Honbou ........................ 429/94 |
| 2011/0104540 A1 | 5/2011 | Lee et al. |

FOREIGN PATENT DOCUMENTS

| | | |
|---|---|---|
| CN | 101504973 A | 8/2009 |
| EP | 1 717 895 A1 | 11/2006 |
| JP | 2000-311701 | 11/2000 |
| JP | 2003-178796 | 6/2003 |
| JP | 2004-311185 | 11/2004 |
| JP | 2008-262827 | 10/2008 |
| JP | 2009059572 | 3/2009 |
| JP | 2010135170 | 6/2010 |
| JP | 2011-60767 | 3/2011 |
| JP | 2011-96660 | 5/2011 |
| JP | 3168282 | 5/2011 |
| KR | 10-2004-0054201 A | 6/2004 |
| KR | 100440934 | 7/2004 |
| KR | 10-2004-0092533 A | 11/2004 |
| KR | 10-2009-0008071 A | 1/2009 |

OTHER PUBLICATIONS

Office Action dated May 30, 2013 for corresponding KR Application No. 10-2011-0073879.

Office Action dated Jul. 23, 2013 for corresponding JP Application No. 2011-196735.

Notice of Allowance dated Oct. 29, 2013 for corresponding KR Application No. 10-2011-0073879.

Notice of Allowance dated Jan. 7, 2014 for corresponding JP Application No. 2011-196735.

Extended European Search Report dated Mar. 16, 2012 for corresponding EP Application No. 11168992.3.

Office Action issued on Jan. 5, 2015 for Chinese Patent Application No. 201110349660.7.

\* cited by examiner

FIG. 6B

SECONDARY BATTERY

RELATED APPLICATIONS

This application claims the benefit of U.S. Provisional Application No. 61/408,984, filed on Nov. 1, 2010, with the U.S. Patent and Trademark Office, the disclosure of which is incorporated herein in its entirety by reference.

BACKGROUND

Aspects of the present invention relate to a secondary battery.

Secondary batteries include an electrode assembly formed by sequentially stacking a positive electrode plate, a negative electrode plate and a separator and winding the same in one direction, a can housing the cylindrical electrode assembly, and a cap plate sealing an open portion of the prismatic can to thereby form a bare cell. The secondary battery generally includes an electrode terminal insulated from the cap plate and serving one of electrodes in the secondary battery. The cap plate and the can may serve the other electrode in the secondary battery.

In the secondary battery, the electrode assembly is wound and then housed into a can in a planar state. When the electrode assembly swells during repeated charge/discharge operations, both of the planar side surfaces of the electrode assembly also swell.

Accordingly, the swelling of the electrode assembly may result in swelling of the can, specifically both side surfaces which have relatively large areas.

In order to achieve the above and other aspects of the present invention, one embodiment of the present invention provides a secondary battery including a plurality of cylindrical electrode assemblies, which is capable of preventing a prismatic can from swelling.

At least one of the above and other features and advantages may be realized by providing a secondary battery including a plurality of cylindrical electrode assemblies wound in a jelly-roll configuration, each having a positive electrode tab connected to a positive electrode plate, and a negative electrode tab connected to a negative electrode plate, a prismatic can housing the plurality of cylindrical electrode assemblies, center pins inserted into the plurality of cylindrical electrode assemblies and coupled to the bottom of the can, and a cap assembly sealing the prismatic can.

In the secondary battery according to the embodiments, swelling of the prismatic can may be prevented by forming a plurality of cylindrical electrode assemblies wound in a jelly-roll configuration and housed in the prismatic can.

SUMMARY

According to an embodiment of the invention, a secondary battery comprises a plurality of electrode assemblies, wherein each electrode assembly comprises a positive electrode plate and a negative electrode plate rolled together with a separator interposed between the positive electrode plate and the negative electrode plate. The secondary battery may comprise a can housing the plurality of electrode assemblies; a cap assembly sealing the can; a positive electrode tab coupled to the positive electrode plate in each electrode assembly; and a negative electrode tab coupled to the negative electrode plate in each electrode assembly. A first plurality of positive electrode tabs is aligned along a first line when viewed in one direction, and a first plurality of negative electrode tabs is aligned along a second line when viewed in the one direction.

According to an aspect, the secondary battery further comprises a second plurality of positive electrode tabs aligned along a third line when viewed in the one direction.

According to an aspect, the secondary battery further comprises a second plurality of negative electrode tabs aligned along a fourth line when viewed in the one direction.

According to an aspect, the secondary battery further comprises a third plurality of positive electrode tabs aligned along a fifth line when viewed in the one direction.

According to an aspect, the secondary battery further comprises a third plurality of negative electrode tabs aligned along a sixth line when viewed in the one direction.

According to an aspect, the first plurality of positive electrode tabs is connected to a positive connection tab, and wherein the first plurality of negative electrode tabs is connected to a negative connection tab.

According to an aspect, the first plurality of positive electrode tabs is connected to a first positive connection tab, the first plurality of negative electrode tabs is connected to a first negative connection tab, the second plurality of positive electrode tabs is connected to a second positive connection tab, and the second plurality of negative electrode tabs is connected to a second negative connection tab.

According to an aspect, the first plurality of positive electrode tabs is connected to a first positive connection tab, the first plurality of negative electrode tabs is connected to a first negative connection tab, the second plurality of positive electrode tabs is connected to a second positive connection tab, the second plurality of negative electrode tabs is connected to a second negative connection tab, the third plurality of positive electrode tabs is connected to a third positive connection tab, and the third plurality of negative electrode tabs is connected to a third negative connection tab.

According to an aspect, the first plurality of positive electrode tabs and the second plurality of positive electrode tabs are connected to a first positive connection tab.

According to an aspect, the first plurality of negative electrode tabs and the second plurality of negative electrode tabs are connected to a first negative connection tab.

According to an aspect, the third plurality of positive electrode tabs is connected to a second positive electrode tab, and the third plurality of negative electrode tabs is connected to a second negative connection tab.

According to an aspect, the first plurality of positive electrode tabs and the first plurality of negative electrode tabs are coupled to a first plurality of electrode assemblies.

According to an aspect, the second plurality of positive electrode tabs and the third plurality of negative electrode tabs are coupled to a second plurality of electrode assemblies.

According to an aspect, the third plurality of positive electrode tabs and the second plurality of negative electrode tabs are coupled to a third plurality of electrode assemblies.

According to an embodiment of the invention, a secondary battery comprises a plurality of electrode assemblies, a can housing the plurality of electrode assemblies, a cap assembly sealing the can, a positive electrode tab coupled to each electrode assembly, and a negative electrode tab coupled to each electrode assembly. The secondary battery may comprise a pin inserted in at least one electrode assembly, wherein the pin is coupled to the bottom surface of the can. A plurality of positive electrode tabs are aligned along a first line when viewed in one direction, and a plurality of negative electrode tabs are aligned along a second line when viewed in the one direction.

According to an aspect, a bottom surface of the pin is welded to the bottom surface of the can.

According to an aspect, the pin comprises a blade extending from a bottom portion of the pin, and the blade is welded to the bottom surface of the can.

According to an aspect, a bottom portion of the pin is bent outwards, and the bent portion is welded to the bottom surface of the can.

According to an aspect, a bottom portion of the pin is engaged with a protrusion formed on the bottom surface of the can.

According to an aspect, the pin comprises a metallic material. According to an aspect, the pin comprises a plastic material.

According to an aspect, the pin has a hollow and cylindrical shape.

According to an aspect, the pin comprises a length in a range of approximately 90% to approximately 110% a total length of the electrode assembly.

According to an aspect, the electrode assembly is cylindrical, and the pin is inserted into a center portion of the cylindrical electrode assembly.

According to an aspect, the positive electrode tabs and the negative electrode tabs have major surfaces that face each other.

According to an aspect, the cap assembly comprises an insulation case, and the positive electrode tabs and the negative electrode tabs are inserted through holes formed in the insulation case.

According to an aspect, the cap assembly further comprises a cap plate, and the negative electrode tabs are electrically connected to electrode terminals positioned on an upper surface of the cap plate.

According to an aspect, the positive electrode tabs are electrically connected to a lower surface of the cap plate.

According to an aspect, the positive electrode tabs are electrically connected to an inner surface of the can.

According to an aspect, the secondary battery further comprises a plurality of pins, wherein each pin is inserted in each of the electrode assemblies, and wherein each pin is coupled to the bottom surface of the can.

DETAILED DESCRIPTION

Embodiments will now be described more fully hereinafter with reference to the accompanying drawings.

Figure 1A:
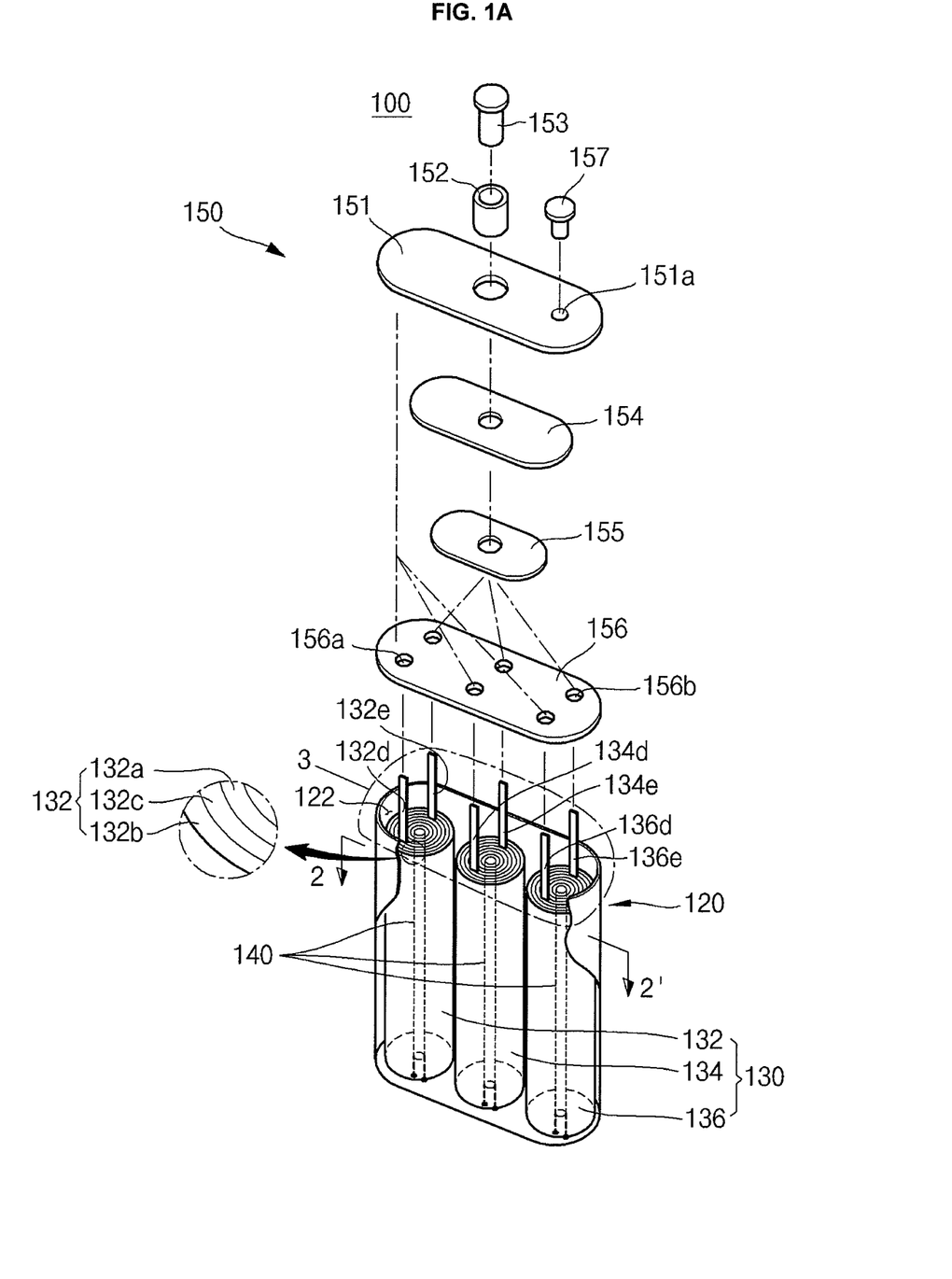
FIG. 1A is an exploded perspective view of a secondary battery according to an embodiment of the present invention.
Figure 1B:
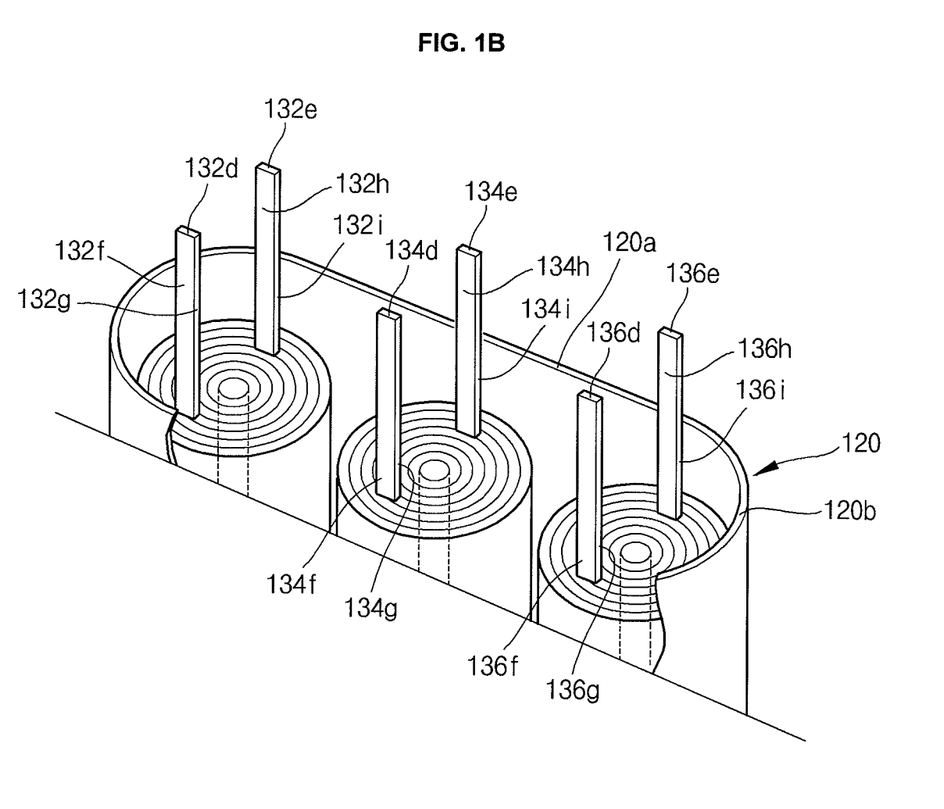
FIG. 1B is an enlarged view illustrating a portion "3" indicated by a dashed dot line in FIG. 1A.

FIG. 1A is an exploded perspective view of a secondary battery according to an embodiment of the present invention, and FIG. 1B is an enlarged view illustrating a portion "3" indicated by a dashed dot line in FIG. 1A.

Figure 2:
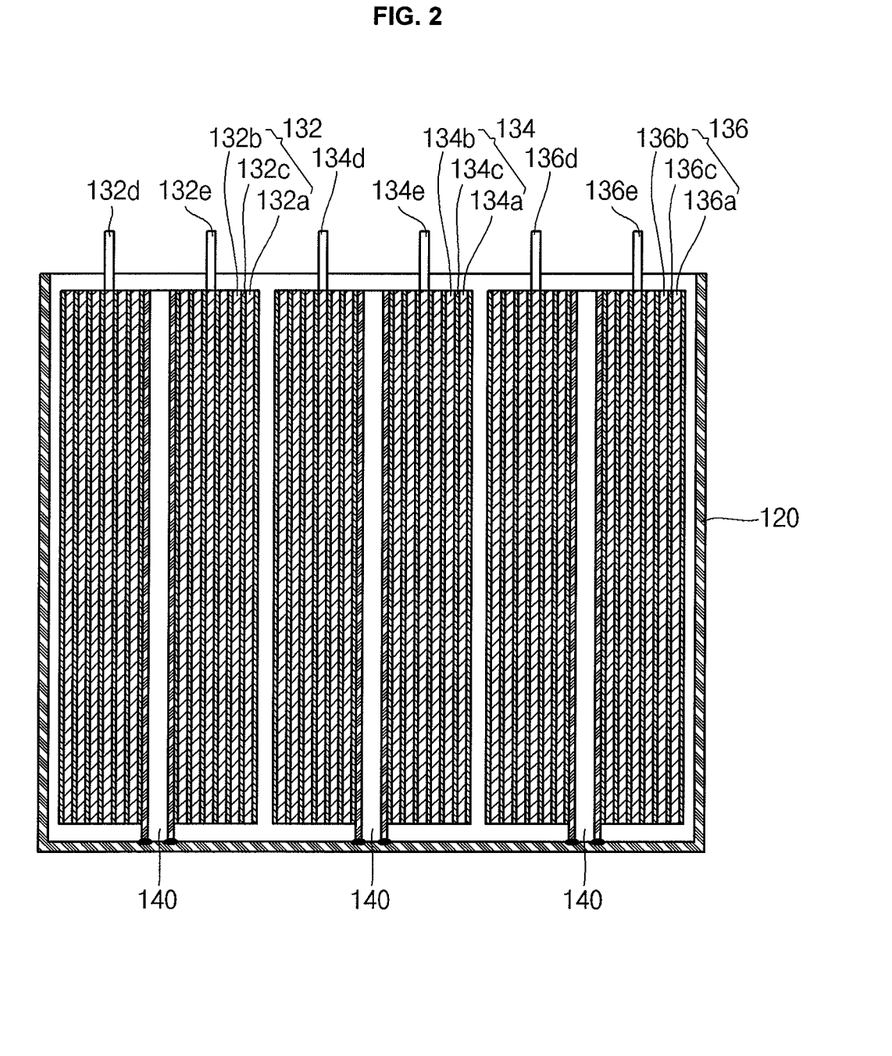
FIG. 2 is a sectional view taken along line 2-2' in FIG. 1A.

FIG. 2 is a sectional view taken along line 2-2' in FIG. 1A. For clarity of description, it is noted that FIG. 2 is obtainable when the electrode assemblies shown in FIG. 1A are rotated by 90 degrees.

Referring to FIG. 1A, the secondary battery 100 according to the illustrated embodiment includes a can 120, a plurality of electrode assemblies 130, center pins 140, and a cap assembly 150.

In the secondary battery 100, the plurality of cylindrical electrode assemblies 130 may be inserted into the prismatic can 120 through an upper open portion formed in the prismatic can 120. The center pins 140 may be inserted into centers of the cylindrical electrode assemblies 130, and may be fixed to the bottom of the can 120. The can 120 may be sealed by the cap assembly 150.

The can 120 may include an opening 122. The can 120 may have a substantially cuboid shape, and side edges thereof may be rounded. In addition, the can 120 may be made of a lightweight, conductive metal such as aluminum or an aluminum alloy, but aspects of the present invention are not limited thereto. In addition, the can 120 can function as an electrode terminal and may be a positive electrode. Preferably, the can 120 may be formed by deep drawing, but aspects of the present invention are not limited thereto.

In addition, an electrolytic solution (not shown) may be injected into the can 120, allowing lithium ions to move between positive and negative electrode plates, the lithium ions generated by an electrochemical reaction carried out in the battery during charge/discharge operations. The electrolytic solution (not shown) may be a non-aqueous organic electrolytic solution prepared by mixing a lithium salt and a high-purity organic solvent. In addition, the electrolytic solution (not shown) may be a polymer using a polymeric electrolyte, but is not limited thereto.

The opening 122 may be formed on a top portion of the can 120, the electrode assemblies 130 may be inserted into the can 120 through the opening 122. The opening 122 may be sealed by the cap assembly 150.

The electrode assemblies 130 may include two or more unit electrode assemblies 130. In an exemplary embodiment, the electrode assemblies 130 may include a first electrode assembly 132, a second electrode assembly 134, and third electrode assembly 136. The first electrode assembly 132, the second electrode assembly 134, and the third electrode assembly 136 may be inserted into a single prismatic can 120 while being spaced apart from each other at minimum intervals.

While three of the electrode assemblies 130 are illustrated herein, aspects of the present invention are not limited thereto and multiple electrode assemblies may be provided.

The first electrode assembly 132 may include a first positive electrode tab 132d and a first negative electrode tab 132e electrically connected to a first positive electrode plate 132a and a first negative electrode plate 132b, respectively. The second electrode assembly 134 may include a second positive electrode tab 134d and a second negative electrode tab 134e electrically connected to a second positive electrode plate 134a and a second negative electrode plate 134b, respectively. In addition, the third electrode assembly 136 may include a third positive electrode tab 136d and a third negative electrode tab 136e electrically connected to a third positive electrode plate 136a and a third negative electrode plate 136b, respectively. Here, the first positive electrode tab 132d, the second positive electrode tab 134d and the third positive electrode tab 136d are electrically connected. In addition, the first negative electrode tab 132e, the second negative electrode tab 134e and the third negative electrode tab 136e are also electrically connected. The first positive electrode tab 132d, the second positive electrode tab 134d and the third positive electrode tab 136d, and the first negative electrode tab 132e, the second negative electrode tab 134e and the third negative electrode tab 136e are all formed to face the opening 122 of the can 120.

In addition, the first electrode assembly 132, the second electrode assembly 134 and the third electrode assembly 136 may be electrically connected in parallel.

Since the first electrode assembly 132, the second electrode assembly 134 and the third electrode assembly 136 can have substantially the same configurations, the following description will focus on the first electrode assembly 132.

The first electrode assembly 132 includes a first positive electrode plate 132a, a first negative electrode plate 132b, and a first separator 132c. The first electrode assembly 132 may be fabricated by stacking the first positive electrode plate 132a and the first negative electrode plate 132b with the first separator 132c interposed therebetween, and the resulting structure may be wound into a jelly roll configuration.

The first positive electrode plate 132a can include a positive electrode collector formed of a highly conductive metal foil, for example, aluminum (Al) foil, and a positive electrode active material coated on a surface of the positive electrode collector. A portion of the positive electrode collector, where the positive electrode active material is not coated, that is, a positive electrode uncoated portion, may be formed at both ends of the first positive electrode plate 132a, and the first positive electrode tab 132d made of Al may be welded to one side of the positive electrode uncoated portion.

The first negative electrode plate 132b can include a negative electrode collector formed of a conductive metal foil, for example, copper (Cu) foil, and a negative electrode active material coated on a surface of the negative electrode collector. A portion of the negative electrode collector, where the negative electrode active material is not coated, that is, a negative electrode uncoated portion, may be formed at both ends of the first negative electrode plate 132b, and the first negative electrode tab 132e made of nickel (Ni) may be welded to one side of the negative electrode uncoated portion.

The first separator 132c is positioned between the first positive electrode plate 132a and the first negative electrode plate 132b. The separator 132c may be formed of a porous film made of polyethylene (PE), polypropylene (PP), or a combination thereof, but aspects of the present invention are not limited thereto.

The first separator 132c can inhibit electronic conduction in the first electrode assembly 132 with the first positive electrode plate 132a and the first negative electrode plate 132b and permit lithium ions to pass therebetween.

The first separator 132c can inhibit the first positive electrode plate 132a and the first negative electrode plate 132b from contacting each other, and prevent the temperature of the secondary battery 100 from increasing by shutting down the flow of current when the temperature of the secondary battery 100 rises due to an external short. In order to prevent a short between the first positive electrode plate 132a and the first negative electrode plate 132b, a ceramic layer prepared by mixing a ceramic material with a binder may further be provided in addition to the first separator 132c.

In addition, the first separator 132c is preferably wider than the first positive electrode plate 132a and the first negative electrode plate 132b in inhibiting a short between electrode plates.

Each of the center pins 140 is shaped of a hollow cylinder. In addition, the length of the center pin 140 is preferably approximately 90 to approximately 110% of the total length of the first electrode assembly 132. If the length of the center pin 140 is less than or equal to 90% of the total length of the first electrode assembly 132, the first electrode assembly 132 can be fixed or supported in a weak state. Meanwhile, if the length of the center pin 140 is greater than or equal to 110% of the total length of the first electrode assembly 132, the center pin 140 may contact components of the cap assembly 150, which is not desirable.

The center pins 140 may be made of a metal. The center pins 140 are inserted into a space formed in the center of the first electrode assembly 132. The center pins 140 may be welded to the bottom of the can 120. The center pins 140 can support the first electrode assembly 132, and suppress deformation and movement of the first electrode assembly 132 due to charge/discharge operations. In addition, since the center pins 140 are formed in the first electrode assembly 132, the second electrode assembly 134 and the third electrode assembly 136, respectively, it can inhibit each electrode assembly from moving due to a volumetric change.

The cap assembly 150 may include a cap plate 151, a gasket 152, an electrode terminal 153, an insulation plate 154, a terminal plate 155, an insulation case 156, and a plug 157.

The cap assembly 150 may be sized and shaped corresponding to the opening 122 of the can 120, and may be installed in the opening 122 of the can 120 to be sealed.

The cap plate 151 may be a planar metal member sized and shaped corresponding to an entrance of the can 120. The cap plate 151 may be coupled to the can 120 by, for example, welding, and can function as the same electrode as the can 120, that is, a positive electrode. In order to facilitate welding, the can 120 and the cap plate 151 may be made of the same electrically conductive metal, such as aluminum or an aluminum alloy. An electrolyte injection hole 151a through which an electrolytic solution is injected may be formed at one side of the cap plate 151.

The first positive electrode tab 132d, the second positive electrode tab 134d, and the third positive electrode tab 136d are welded to the bottom surface of the cap plate 151 to then be electrically connected, so that the outside of the secondary battery 100, excluding the electrode terminal 153, can function as a positive electrode terminal. Here, the positive electrode tabs 132d, 134d, and 136d may penetrate through-holes 156a formed in the insulation case 156, respectively, which will later be described, and then be adhered to a bottom surface of the cap plate 151 after being bent if necessary. Alternatively, the first positive electrode tab 132d, the second positive electrode tab 134d, and the third positive electrode tab 136d may also be directly electrically connected to an inner surface of the can 120.

According to an embodiment, the gasket 152 is tubular and positioned on an outer surface of the electrode terminal 153. The gasket 152 may insulate the electrode terminal 153 from the cap plate 151.

The electrode terminal 153 may be positioned at the cap assembly 150, and extend through the cap plate 151 while surrounding the outer circumference surface of the gasket 152. The first negative electrode plate 132b, the second negative electrode tab 134b, and the third negative electrode tab 136b may be electrically connected to the electrode terminal 153, functioning as a negative electrode terminal.

According to an embodiment, the insulation plate 154 is plate-shaped and positioned on the bottom surface of the cap plate 151. The insulation plate 154 may be made of the same insulating material as the gasket 152. Therefore, the cap plate 151 and the terminal plate 155 to be described later may be insulated from each other by the insulation plate 154.

The terminal plate 155 may be made of a metal and is positioned on the bottom surface of the insulation plate 154. The electrode terminal 153 may be riveted by the terminal plate 155, so that it may not be dislodged from the cap plate 151.

The first negative electrode tab 132e, the second negative electrode tab 134e, and the third negative electrode tab 136e may be directly welded to the terminal plate 155, and the terminal plate 155 may be installed to be electrically conducted to the electrode terminal 153, thereby allowing the electrode terminal 153 to function as a negative electrode terminal. Here, the negative electrode tabs 132e, 134e, and 136e may penetrate the throughholes 156a formed in the insulation case 156, respectively, which will later be described, and then be adhered to the bottom surface of the cap plate 151 after being bent if necessary.

Meanwhile, the terminal plate 155 may not be provided, and accordingly, the first negative electrode tab 132e, the second negative electrode tab 134e, and the third negative electrode tab 136e may be directly connected to the electrode terminal 153.

According to an embodiment, the insulation case 156 is installed between the electrode assembly 130, specifically the electrode assemblies 132, 134 and 136, and the cap assembly 150 to prevent the electrode assemblies 132, 134 and 136 from moving up and down. In addition, the insulation case 156 may be installed to prevent the electrode assemblies 132, 134 and 136 from being directly shorted to the cap assembly 150. In addition, the insulation case 156 can include a plurality of throughholes 156a and 156b to allow the positive electrode tabs 132d, 134d, and 136d and the negative electrode tabs 132e, 134e, and 136e to pass therethrough upwardly. Further, the electrolytic solution injected through the electrolyte injection hole 151a may be provided to the lower electrode assemblies 132, 134 and 136 via the throughholes 156a and 156b of the insulation case 156. The insulation case 156 may be made of a polymeric resin having an insulating property, preferably, polypropylene.

The plug 157 may be provided to seal the electrolyte injection hole 151a after the electrolytic solution is injected into the can 120 through the electrolyte injection hole 151a. The plug 157 may be generally made of aluminum or an aluminum containing metal. The plug 157 may be mechanically pressed into the electrolyte injection hole 151a and then engaged with the electrolyte injection hole 151a.

A secondary battery 200 according to another embodiment of the present invention will now be described.

Figure 3:
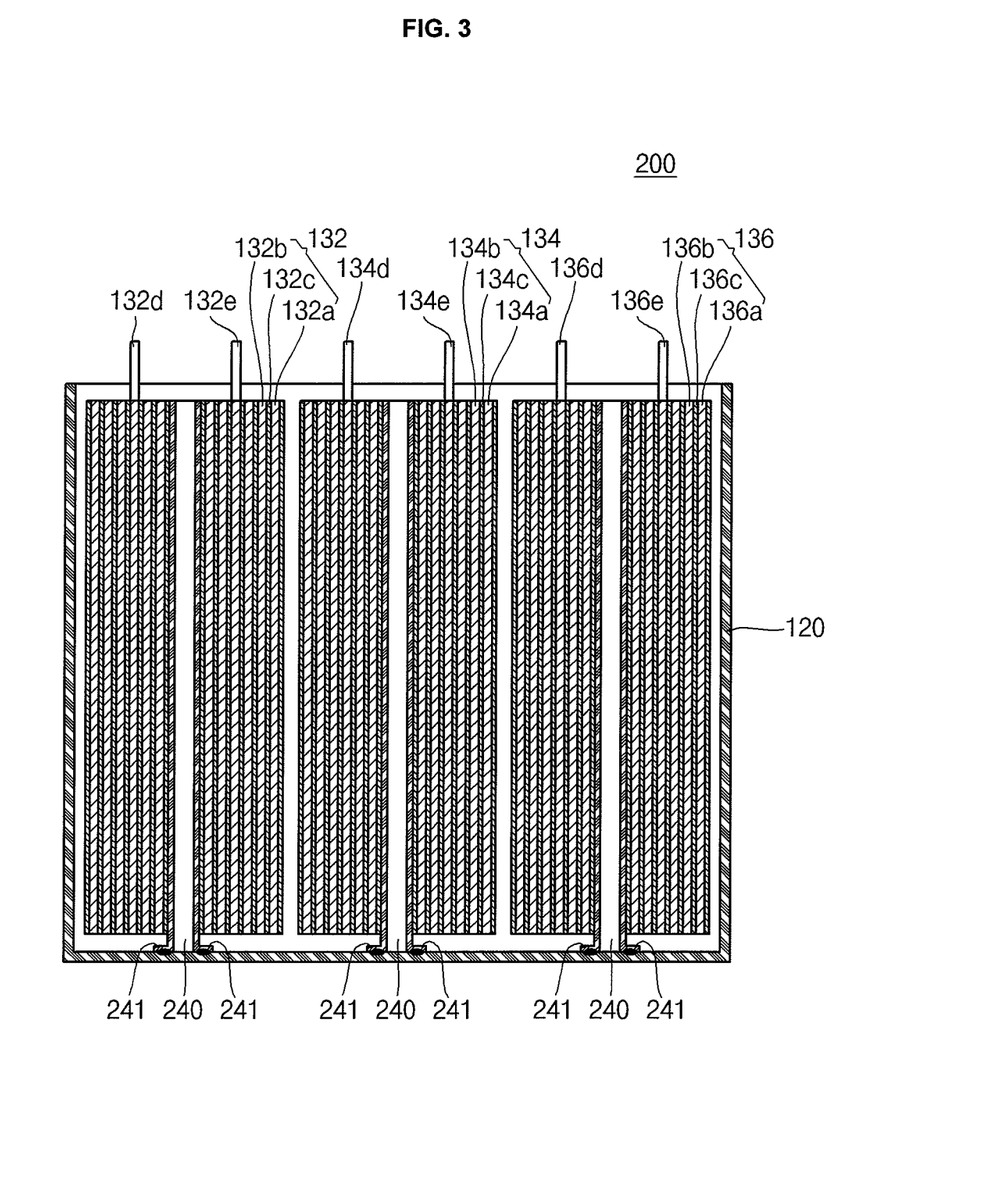
FIG. 3 is a vertical section view illustrating a portion corresponding to FIG. 2 in a secondary battery according to another embodiment of the present invention.

FIG. 3 is a vertical section view illustrating a portion corresponding to FIG. 2 in a secondary battery according to another embodiment of the present invention.

The secondary battery 200 according to the illustrated embodiment of the present invention includes a can 120, electrode assemblies 130, center pins 240, and a cap assembly 150.

Referring to FIG. 1B, which is an enlarged view illustrating a portion "3" indicated by a dashed dot line in FIG. 1A, main surfaces 132f, 134f and 136f of the plurality of positive electrode tabs 132d, 134d and 136d are formed to face main surfaces 132h, 134h and 136h of the plurality of negative electrode tabs 132e, 134e and 136e. The main surfaces 132f, 134f and 136f of the plurality of positive electrode tabs 132d, 134d and 136d and the main surfaces 132h, 134h and 136h of the plurality of negative electrode tabs 132e, 134e and 136e face a main surface 120a of the can 120. Narrow surfaces 132g, 134g and 136g of the plurality of positive electrode tabs 132d, 134d and 136d and narrow surfaces 132i, 134i and 136i of the plurality of negative electrode tabs 132e, 134e and 136e face a round surface 120b of the can 120.

The positive electrode tabs 132d, 134d and 136d are aligned along a line, which means that the negative electrode tabs 132e, 134e and 136e are not positioned along the line formed by the plurality of positive electrode tabs 132d, 134d and 136d.

The negative electrode tabs 132e, 134e and 136e may be positioned on a line different from the line along which the plurality of positive electrode tabs 132d, 134d and 136d. That is to say, the plurality of positive electrode tabs 132d, 134d and 136d may not be positioned along the line formed by the plurality of negative electrode tabs 132e, 134e and 136e.

Figure 5A:
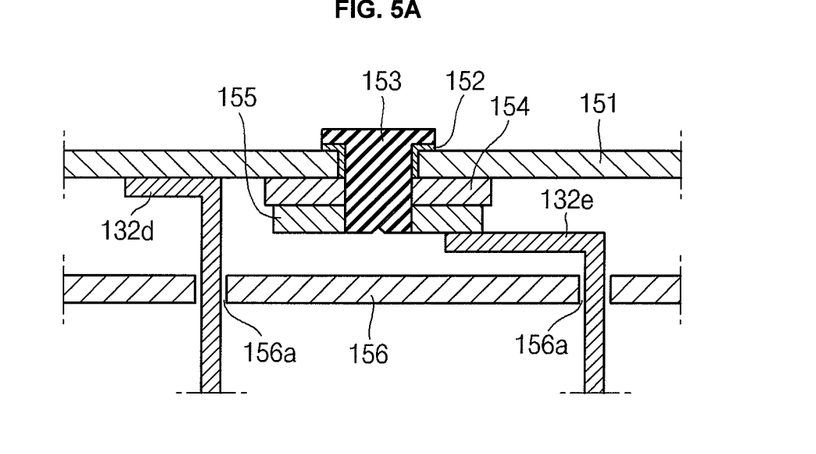
FIGS. 5A and 5B are sectional views illustrating coupled states of the secondary battery shown in FIG. 1A.

FIG. 5A is a sectional view illustrating a coupled state of the secondary battery shown in FIG. 1A.

The plurality of positive electrode tabs 132d, 134d and 136d are connected to the cap plate 151, respectively. The plurality of positive electrode tabs 132d, 134d and 136d may penetrate the throughholes 156a formed in the insulation case 156 to then be bent, respectively, and may be coupled to the bottom surface of the cap plate 151.

The plurality of negative electrode tabs 132e, 134e and 136e may penetrate the throughholes 156b formed in the insulation case 156 to then be bent, respectively, and may be coupled to the bottom surface of the terminal plate 155.

Figure 5B:
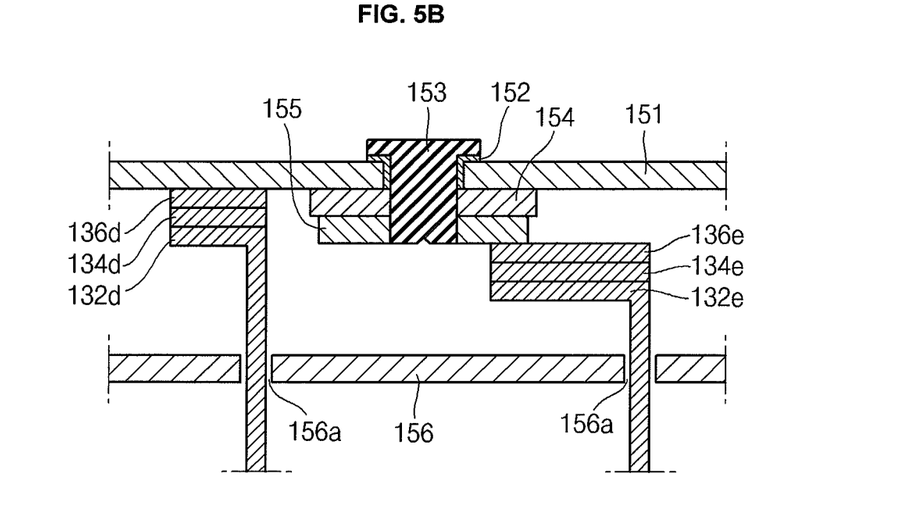

FIG. 5B is a sectional view illustrating another example of a coupled state of the secondary battery shown in FIG. 1A.

The plurality of positive electrode tabs 132d, 134d and 136d may be stacked one on top of another to then be coupled to the cap plate 151. The plurality of positive electrode tabs 132d, 134d and 136d may penetrate the throughholes 156a formed in the insulation case 156 to then be bent, respectively, and may be coupled to the bottom surface of the cap plate 151 in a state where they are stacked one on top of another.

The plurality of negative electrode tabs 132e, 134e and 136e may penetrate throughholes 156b formed in the insulation case 156 to then be bent, respectively, and may be coupled to the bottom surface of the terminal plate 155 in a state where they are stacked one on top of another.

The secondary battery 200 according to the present embodiment is substantially the same as the secondary battery 100 shown in FIGS. 1 and 2, except for the configurations of the center pins 240. Thus, the following description will focus on the center pins 240. In addition, since the can 120, the electrode assemblies 130 and the cap assembly 150 of the secondary battery 200 according to the illustrated embodiment of the present invention are formed in the same manner as corresponding ones of the previous embodiment shown in FIGS. 1 and 2, they will be identified by the same reference numerals, and detailed descriptions thereof will be omitted.

Referring to FIG. 3, each of the center pins 240 includes a blade 241 formed on its bottom surface. The blade 241 is formed such that the bottom of the center pin 240 is bent and faces outwardly.

The center pin 240 may be made of a metal. The blade 241 of the center pin 240 may be welded to the bottom of the can 120. Since the blade 241 contacts the bottom of the can 120 with an increasing contact area, the center pin 240 can be more effectively supported, thereby improving coupling reliability.

Figure 4:
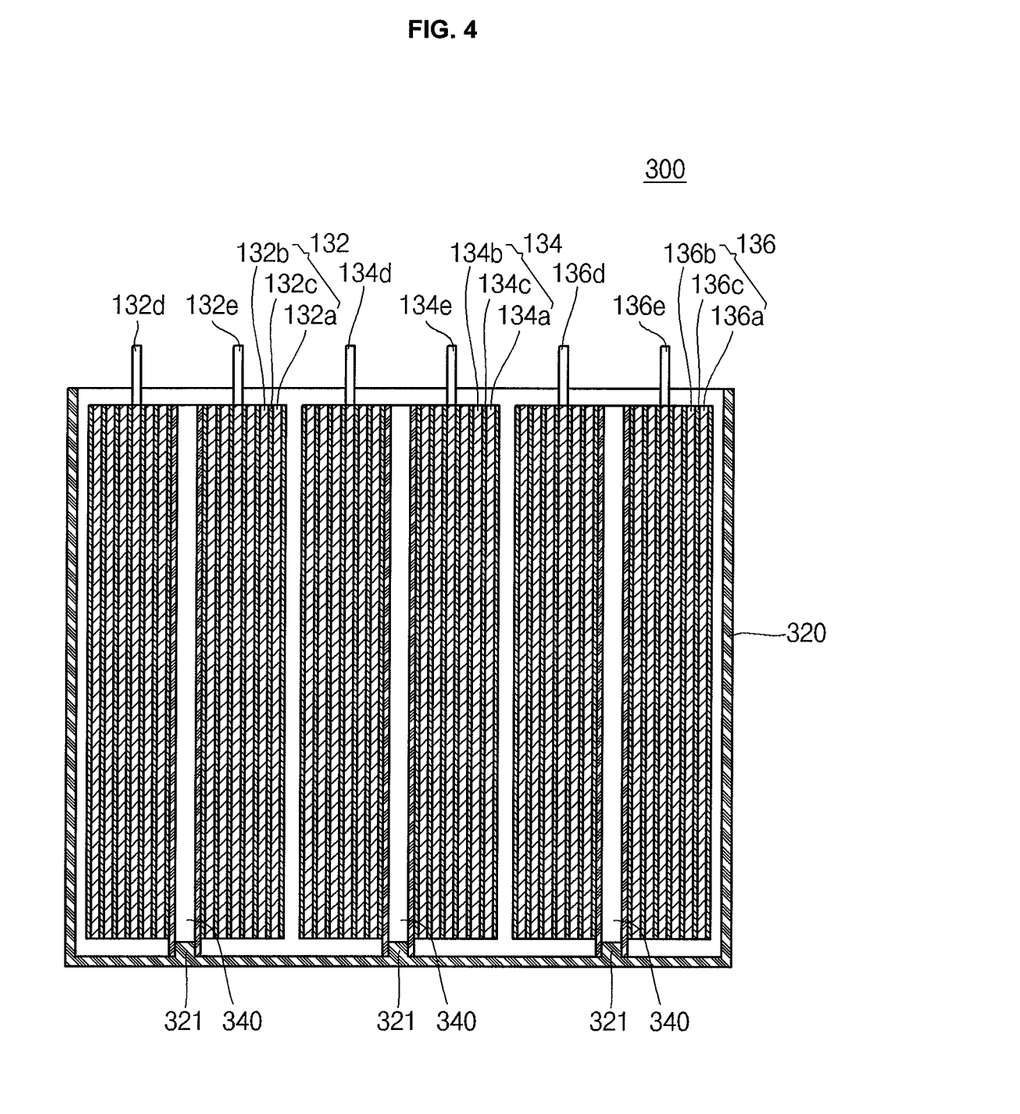
FIG. 4 is a vertical section view illustrating a portion corresponding to FIG. 2 in a secondary battery according to another embodiment of the present invention.

A secondary battery according to another embodiment of the present invention will now be described. FIG. 4 is a vertical section view illustrating a portion corresponding to FIG. 2 in a secondary battery according to another embodiment of the present invention.

The secondary battery 300 according to the illustrated embodiment includes a can 320, electrode assemblies 130, a center pin 340, and a cap assembly 150.

The secondary battery 300 according to the present embodiment is substantially the same as the secondary battery 100 shown in FIGS. 1 and 2, except for configurations of the can 320 and the center pin 340. Thus, the following description will focus on the can 320 and the center pin 340. In addition, since the electrode assemblies 130 and the cap assembly 150 of the secondary battery 300 according to the illustrated embodiment of the present invention are formed in the same manner as corresponding ones of the previous embodiment shown in FIGS. 1 and 2, they will be identified by the same reference numerals, and detailed descriptions thereof will be omitted.

Referring to FIG. 4, the can 320 may have protruding parts 321 formed at its bottom surface. The protruding parts 321 may have a size and height large enough for the bottom portion of the center pin 340 to be engaged with and fixed. In addition, the number of the protruding parts 321 may correspond to that of the center-pins 340. Since the center pin 340 is directly engaged with each of the protruding parts 321, it can reduce a welding process for fixedly welding the can 320 and the center pin 340 to each other.

The center pin 340 may be shaped of a cylinder and made of a metallic or plastic material.

A secondary battery according to yet another embodiment of the present invention will now be described.

Figure 6A:
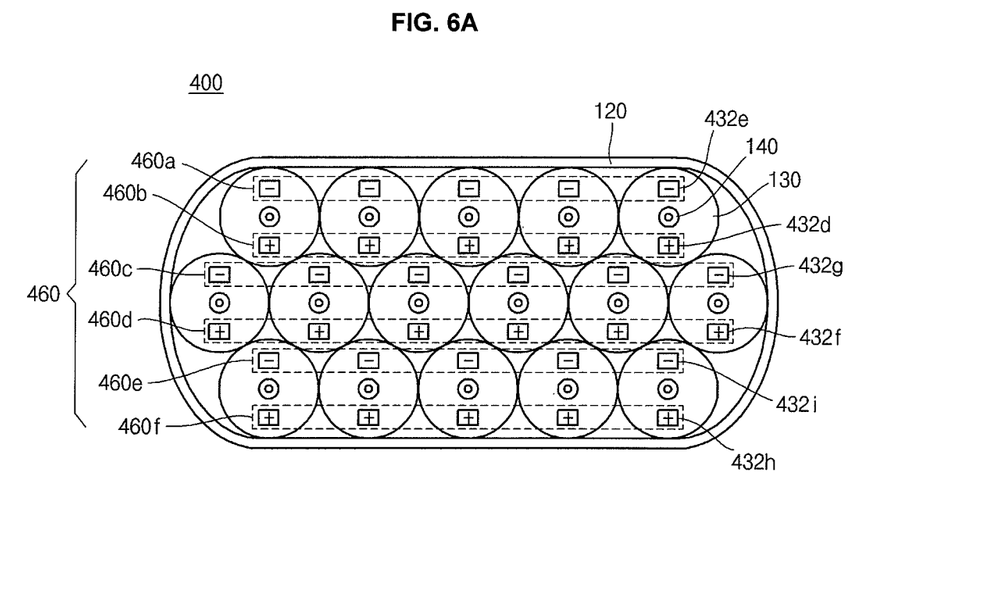
FIG. 6A is a front view illustrating a plurality of electrode assemblies inserted into a can of a secondary battery according to another embodiment of the invention.

FIG. 6A is a front view illustrating a plurality of electrode assemblies inserted into a can of a secondary battery according to yet another embodiment of the present invention.

The secondary battery 400 according to the illustrated embodiment of the present invention includes a can 120, electrode assemblies 130, center pins 140, a connection tab 460, an insulation case (not shown), and a cap plate (not shown).

In the illustrated secondary battery 400, the electrode assemblies 130 are arranged in a manner different from those shown in FIGS. 1A through 2, and the connection tab 460 is additionally provided. Thus, the following description of the illustrated embodiment of the present invention will focus on the arranged state of the electrode assemblies 130 and the connection tab 460. In addition, since the can 120, the electrode assemblies 130, the center pins 140, the connection tab 460, the insulation case (not shown) and the cap plate (not shown) of the illustrated secondary battery 400 are substantially the same as those of the previous embodiment shown in FIGS. 1A through 2, the same and corresponding functional components will be denoted by the same reference numerals and detailed descriptions thereof will not be given.

At least three lines of the plurality of electrode assemblies 130 may be aligned in a row, respectively. The illustrated embodiment of the present invention does not limit the number of lines of the electrode assemblies 130 to that illustrated herein.

The plurality of electrode assemblies 130 may be aligned such that a plurality of negative electrode tabs 432e, 432g and 432i are aligned above the respective center pins 140 while a plurality of positive electrode tabs 432d, 432f and 432h are aligned below the respective center pins 140. Therefore, the positive electrode tabs 432d of the electrode assemblies 130 positioned on the first line and the negative electrode tabs 462g of the electrode assemblies 130 positioned on the second line alternately face each other.

The connection tab 460 may include negative electrode connection tabs 460a, 460c and 460e and positive electrode connection tabs 460b, 460d and 460f. The connection tab 460 may be shaped of a substantially rectangular plate. The connection tab 460 may be positioned on the insulation case (not shown). Here, the connection tab 460 can extend through the negative electrode connection tabs 460a, 460c and 460e, the positive electrode connection tabs 460b, 460d and 460f, and the insulation case (not shown) to be connected with the cap plate and terminal plate (?).

Specifically, the positive electrode connection tabs 460b, 460d and 460f may be connected to the positive electrode tabs 432d, 432f and 432h, and the negative electrode connection tabs 460a, 460c and 460e are connected to the negative electrode tabs 432e, 432g and 432i. The positive electrode connection tabs 460b, 460d and 460f and the positive electrode tabs 432d, 432f and 432h may be connected to each other to then be connected to the cap plate (not shown). The negative electrode connection tabs 460a, 460c and 460e and the negative electrode tabs 432e, 432g and 432i may be connected to each other to then be connected to the terminal plate (not shown).

In the present embodiment, the number of the connection tab 460 formed is six (6) in total. That is to say, each three connection tabs are formed, including three of the negative electrode connection tabs 460a, 460c and 460e and three of the positive electrode connection tabs 460b, 460d and 460f. However, the illustrated embodiment of the present invention does not limit the number of the connection tab 460 to that illustrated herein.

A secondary battery according to another embodiment of the present invention will now be described.

Figure 6B:
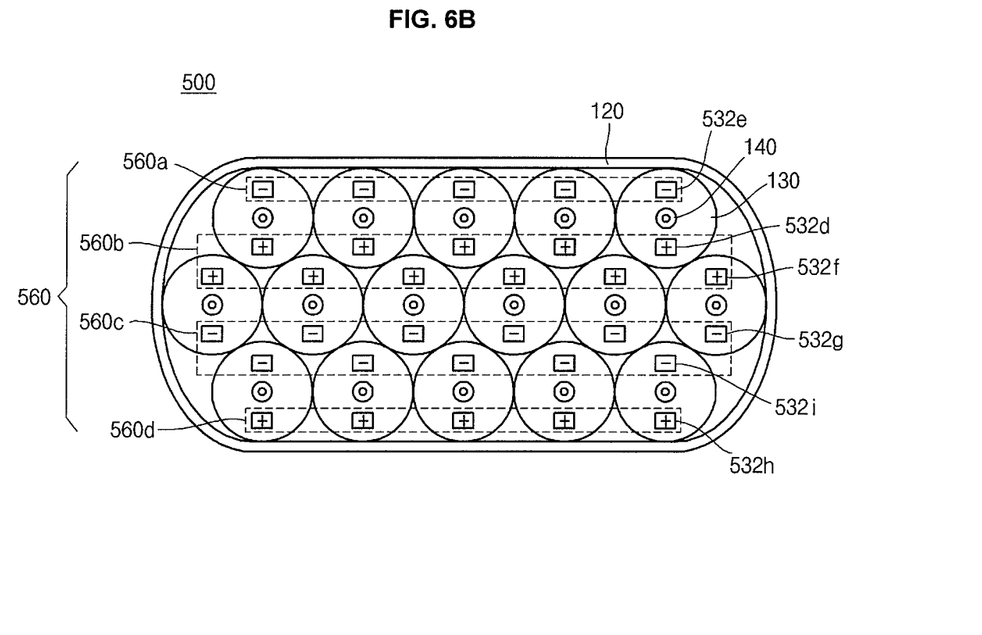
FIG. 6B is a front view illustrating a plurality of electrode assemblies inserted into a can of a secondary battery according to another embodiment of the present invention.

FIG. 6B is a front view illustrating a plurality of electrode assemblies inserted into a can of a secondary battery according to another embodiment of the present invention.

The secondary battery 500 according to the illustrated embodiment of the present invention includes a can 120, electrode assemblies 130, center pins 140, a connection tab 560, an insulation case (not shown), and a cap plate (not shown).

In the illustrated secondary battery 500, the electrode assemblies 130 are arranged in a different manner from those shown in FIGS. 1A through 2, and the connection tab 560 is additionally provided. Thus, the following description of the illustrated embodiment of the present invention will focus on the arranged state of the electrode assemblies 130 and the connection tab 460. In addition, since the can 120, the electrode assemblies 130, the center pins 140, the connection tab 560, the insulation case (not shown) and the cap plate (not shown) of the illustrated secondary battery 500 are substantially the same as those of the previous embodiment shown in FIGS. 1A through 2, the same and corresponding functional components will be denoted by the same reference numerals and detailed descriptions thereof will not be given.

At least three lines of the plurality of electrode assemblies 130 may be aligned in a row. However, the illustrated embodiment of the present invention does not limit the number of lines of the electrode assemblies 130 to that illustrated herein.

The plurality of electrode assemblies 130 may be aligned such that positive electrode tabs 532f and negative electrode tabs 532g of the second line are aligned opposite to positive electrode tabs 532d and 532h and negative electrode tabs 532e and 532i of the first and third lines in view of the respective center pins 140.

Therefore, the positive electrode tabs 532d of the electrode assemblies 130 positioned on the first line and the positive electrode tabs 532f of the electrode assemblies 130 positioned on the second line alternately face each other.

The connection tab 560 may include positive electrode connection tabs 560b and 560d and negative electrode connection tabs 560a and 560c. The connection tab 560 may be shaped of a substantially rectangular plate. The connection tab 560 may be positioned on the insulation case (not shown). Here, the connection tab 560 may extend through the positive electrode tabs 532d, 532f and 532h and the negative electrode tabs 532e, 532g and 532i, and the insulation case (not shown) to be connected with the cap plate and terminal plate.

Specifically, the positive electrode connection tabs 560b and 560d may be connected to the positive electrode tabs 532d, 532f and 532h, and the negative electrode connection tabs 560a and 560c may be connected to the negative electrode tabs 532e, 532g and 532i.

The positive electrode connection tabs 560b and 560d and the positive electrode tabs 532d, 532f and 532h may be connected to each other to then be connected to the cap plate (not shown). The negative electrode connection tabs 560a and 560c and the negative electrode tabs 532e, 532g and 532i may be connected to each other to then be connected to the terminal plate (not shown).

The number of the connection tab 560 formed may be four (4) in total. That is to say, each two connection tabs are formed, including two of the positive electrode connection tabs 560b and 560d and two of the negative electrode connection tabs 560a and 560c. However, the illustrated embodiment of the present invention does not limit the number of the connection tab 560 to that illustrated herein.

The plurality of electrode assemblies 130 may be aligned such that the positive electrode tabs 532f and the negative electrode tabs 532g of the second line are aligned opposite to the positive electrode tabs 532d and 532h and the negative electrode tabs 532e and 532i of the first and third lines in view of the respective center pins 140, so that corresponding parts of the electrode assemblies 130 have the same polarity, thereby reducing the number of the connection tab 560.

While this invention has been particularly shown and described with reference to preferred embodiments thereof, it will be understood by those skilled in the art that various changes in form and details may be made therein without departing from the spirit and scope of the invention.

What is claimed is:

1. A secondary battery comprising:
a plurality of electrode assemblies that are separate from each other; a can housing the plurality of electrode assemblies;
a cap assembly sealing the can wherein the cap assembly includes a cap plate and an electrode formed on the cap plate;
a positive electrode tab coupled to each electrode assembly; a negative electrode tab coupled to each electrode assembly; and a pin inserted in at least one electrode assembly, wherein the pin is coupled to a bottom surface of the can,
wherein a plurality of positive electrode tabs each having an outer end is aligned along a first line when viewed in one direction wherein the plurality of positive electrodes are distributed over the first line that extends over the plurality of electrode assemblies, and
wherein a plurality of negative electrode tabs each having an outer end is aligned along a second line when viewed in the one direction wherein the plurality of negative electrodes are distributed over the second line that extends over the plurality of electrode assemblies wherein the plurality of positive electrode tabs and the plurality of negative electrode tabs extend out of a first side of the plurality of electrode assemblies and wherein each of the outer ends of the plurality of positive electrode tabs from each of the different plurality of electrode assemblies are directly connected to each other adjacent the cap assembly or can and wherein each of the outer ends of the plurality of negative electrode tabs from each of the different plurality of electrode assemblies are directly connected to each other at a location where one of the plurality of negative electrode tabs is connected to the electrode on the cap plate,
wherein the pin is coupled to the can adjacent to a second side opposite to the first side of the plurality of electrode assemblies, so that the positive electrode tab and the negative electrode tab is formed to the first side of the plurality of electrode assemblies only,
wherein a number of the positive electrode tab, negative electrode tab and pin correspond to a number of the electrode assembly.

2. The secondary battery of claim 1, wherein a bottom surface of the pin is welded to the bottom surface of the can.

3. The secondary battery of claim 1, wherein the pin comprises a blade extending from a bottom portion of the pin, and wherein the blade is welded to the bottom surface of the can.

4. The secondary battery of claim 1, wherein a bottom portion of the pin is bent outwards, and wherein the bent portion is welded to the bottom surface of the can.

5. The secondary battery of claim 1, wherein a bottom portion of the pin is engaged with a protrusion formed on the bottom surface of the can.

6. The secondary battery of claim 1, wherein the pin has a hollow and cylindrical shape.

7. The secondary battery of claim 1, wherein the pin comprises a length in a range of approximately 90% to approximately 110% a total length of the at least one electrode assembly.

8. The secondary battery of claim 1, wherein the at least one electrode assembly is cylindrical, and the pin is inserted into a center portion of the cylindrical electrode assembly.

9. The secondary battery of claim 1, wherein the positive electrode tabs and the negative electrode tabs have major surfaces that face each other.

10. The secondary battery of claim 1, wherein the positive electrode tabs are electrically connected to a lower surface of the cap plate.

11. The secondary battery of claim 1, wherein the positive electrode tabs are electrically connected to an inner surface of the can.

12. The secondary battery of claim 1, further comprising a plurality of pins, wherein each pin is inserted in each of the electrode assemblies, and wherein each pin is coupled to the bottom surface of the can.

\* \* \* \* \*